Sept. 23, 1958 D. KERR 2,853,539
ENCLOSURE FOR ELECTRONIC APPARATUS
Filed Oct. 12, 1953
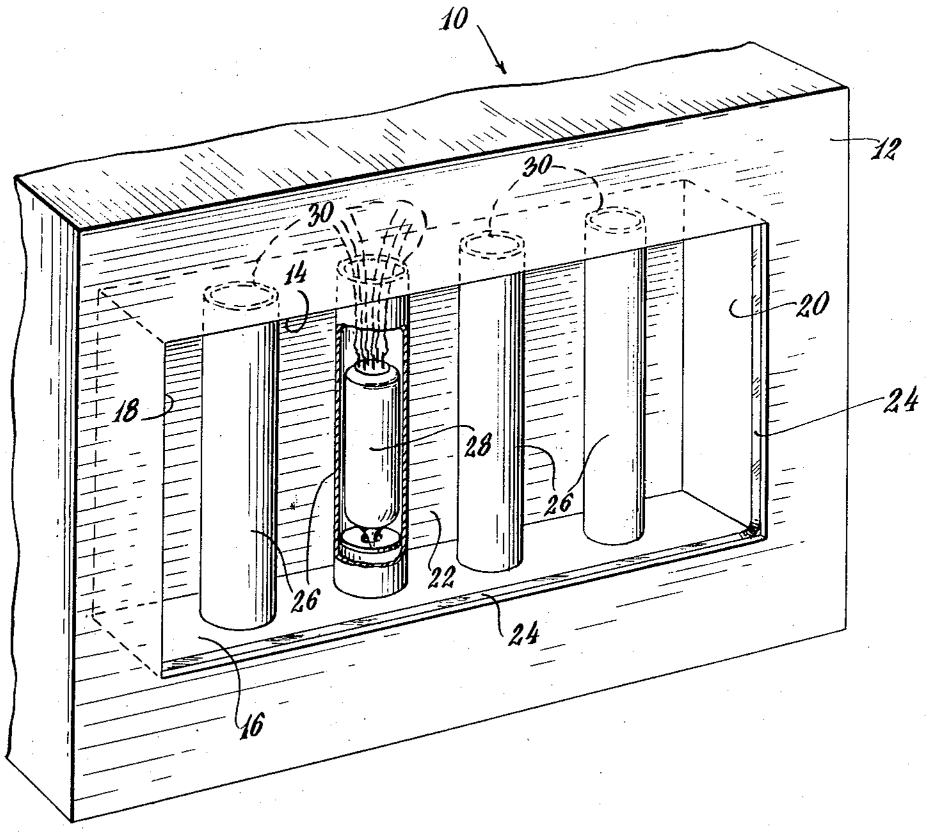
INVENTOR.
David Kerr
BY
Churchill, Rich, Weymouth & Engel
Att'ys.

United States Patent Office 2,853,539

Patented Sept. 23, 1958

2,853,539

ENCLOSURE FOR ELECTRONIC APPARATUS

David Kerr, Ealing, London, England, assignor to Ultra Electric, Inc., Wilmington, Del., a corporation of Delaware Application October 12, 1953, Serial No. 385,624

Claims priority, application Great Britain October 14, 1952

4 Claims. (Cl. 174—15)

This invention relates to enclosures for electronic apparatus and more particularly to enclosures for combinations of heat producing and relatively non-heat producing electronic components.

In certain applications involving electronic apparatus it is necessary to seal the case or housing therefor in order to prevent the ingress of moisture or to maintain adequate ambient pressure for the protection of the components. For example, in marine equipment the apparatus must be moisture proof to prevent corrosion, while in aircraft equipment adequate pressure must be maintained or sealed components are apt to explode. However, sealing the enclosure creates a problem in connection with the cooling of those components which generate heat.

The object of the present invention is to provide an enclosure or case for electronic apparatus which may be sealed and still provide for adequate cooling of the heat producing components without adverse effect upon the remaining apparatus.

According to the present invention the enclosure is provided with separate compartments for the heat and relatively non-heat producing components or members, the compartments for the heat producing components being arranged to radiate the generated heat to the surrounding medium without substantial heat transfer to the compartment or compartments enclosing the relatively non-heat producing members.

The invention will be better understood after reading the following detailed description of a typical embodiment thereof in connection with the accompanying drawing of which the sole figure represents the relevant portion of a piece of electronic apparatus embodying the invention.

Referring to the drawing there is shown at 10 a portion of an enclosure or housing for electronic apparatus. An open recess or reentrant portion is provided in a wall 12 of the enclosure 10. The recess is illustrated as defined by parallel top and bottom walls 14 and 16, side walls 18 and 20, and back wall 22. The designations top, bottom, and so forth have been arbitrarily chosen for ease of description and are not to be construed in a limiting manner. The walls 14 to 20 are hermetically joined to the wall 12 by means of heat insulating means 24. Glass, for example, may be employed for this purpose and joined to the metal of which walls 14 to 20 are formed in any well known manner. The wall 12 may also be metallic and is joined to the glass or other heat insulating material in similar fashion.

As shown in the drawing, cylinders 26 of heat conducting material (normally metal) are positioned within the confines of the recess and secured to the top and bottom walls 14 and 16. Heat generating components such as the vacuum tube 28 are mounted within the cylinders 26. Each cylinder communicates with the interior of the enclosure 10 by way of apertures 30 in one or both walls 14 and 16. Usually one aperture is provided for each cylinder. Thus, provision is made for connecting the tube 28 or other component housed within a cylinder 26 to other components in the main compartment of enclosure 10 or in other cylindrical compartments 26.

It should be apparent that heat insulating material may be employed to join the cylinders 26 to the walls 14 and 16. In such case the material 24 may be dispensed with. Although cylindrical heat radiating compartments 26 have been illustrated, these compartments can take any shape depending upon the particular electronic component or components they are intended to house. The recess in the wall 12 need not take the exact form illustrated but may, for example, be open at its ends, comprising merely a channel in a side of the principal enclosure.

It should now be evident that the enclosure provided has a first or main compartment for the relatively non-heat producing components, and a plurality of additional compartments 26 for the heat producing components. Thus heat generated within the enclosures 26 is readily radiated to the surrounding medium and communicated, only with difficulty, to the interior of the main portion of the enclosure 10.

Having now described the invention in terms of a typical embodiment thereof, what I claim is:

1. An enclosure for electronic apparatus having a main compartment for the relatively non-heat producing components of the apparatus, said main compartment being formed from a plurality of hermetically joined wall members, at least one of said wall members having a re-entrant portion therein for providing exteriorly of said main compartment a mounting area for the heat producing components of the apparatus, and at least one additional compartment disposed within said re-entrant portion for accommodating said heat producing components and having its interior in communication with the interior of said main compartment, said additional compartment being formed of walls of heat conducting material extending between and hermetically joined to a pair of opposite walls of said re-entrant portion, whereby a hermetically sealed enclosure is provided for the entire apparatus which separates the heat producing components from the relatively non-heat producing components so as to reduce substantially the communication of heat from the former to the latter.

2. An enclosure according to claim 1, wherein the wall members of said main compartment are metallic, and heat insulating material is disposed in the wall member having said re-entrant portion, said heat insulating material being disposed around the mouth of said re-entrant portion to form a thermal barrier against the transmission of heat by conduction from the walls of the re-entrant portion to the remaining walls of said main compartment.

3. An enclosure according to claim 1, wherein the wall members of said main compartment are metallic, and heat insulating material is disposed in the junctions between the walls of said additional compartment and said pair of opposite walls of the re-entrant portion to provide a thermal barrier therebetween against the transmission of heat by conduction from the walls of said additional compartment to the walls of said main compartment.

4. An enclosure for electronic apparatus having a main compartment for the relatively non-heat producing components of the apparatus, said main compartment being formed from a plurality of hermetically joined wall members, at least one of said wall members having a re-entrant portion therein for providing exteriorly of said main compartment a mounting area for the heat producing components of the apparatus, and a plurality of additional compartments disposed within said re-entrant portion each for accommodating a separate one of said heat producing components and having their interiors in communication with the interior of said main compartment, said additional compartments being formed of walls of heat conducting material extending between and hermetically joined to a pair of opposite walls of said re-entrant portion, whereby a hermetically sealed enclosure is provided for the entire apparatus which separates the heat producing components from the relatively non-heat producing components so as to reduce substantially the communication of heat from the former to the latter.

References Cited in the file of this patent

UNITED STATES PATENTS

| | | |
|---|---|---|
| 1,629,825 | Kenan | May 24, 1927 |
| 1,874,478 | Fayer | Aug. 30, 1932 |
| 2,158,868 | Stacy | May 16, 1939 |
| 2,187,011 | Braden | Jan 16, 1940 |
| 2,462,489 | Hallett | Feb. 22, 1949 |
| 2,499,589 | Kennedy | Mar. 7, 1950 |
| 2,662,109 | Tapp et al. | Dec. 8, 1953 |
| 2,760,122 | Harris | Aug. 21, 1956 |

FOREIGN PATENTS

| | | |
|---|---|---|
| 371,099 | Great Britain | Apr. 21, 1932 |